United States Patent

Masutani et al.

[11] Patent Number: 5,961,401
[45] Date of Patent: Oct. 5, 1999

[54] GOLF BALLS

[75] Inventors: Yutaka Masutani; Keisuke Ihara; Hirotaka Shimosaka; Michio Inoue; Atsuki Kasashima, all of Saitama, Japan

[73] Assignee: Bridgestone Sports Co., Ltd., Tokyo, Japan

[21] Appl. No.: 08/964,199

[22] Filed: Nov. 4, 1997

[30] Foreign Application Priority Data

Nov. 5, 1996 [JP] Japan ................................ 8-292483

[51] Int. Cl.[6] .................................................. A63B 37/12
[52] U.S. Cl. ........................... 473/374; 473/377; 473/378
[58] Field of Search .................................... 473/383, 384, 473/385, 378, 374, 377

[56] References Cited

U.S. PATENT DOCUMENTS 1,482,232  1/1924  Hazeltine ................................ 473/385

Primary Examiner—George J. Marlo
Attorney, Agent, or Firm—Sughrue, Mion, Zinn, Macpeak & Seas, PLLC

[57] ABSTRACT

A golf ball is composed of at least a pair of adjacent concentric solid layers or three adjacent concentric solid layers. In the former case, the outer solid layer is composed of a matrix and non-metallic high-hardness grains having hardness higher than that of the matrix which has a Shore D range of 36–40. In the later case, the intermediate solid layer is composed of a matrix and high-hardness grains having hardness higher than that of the matrix. The high-hardness grains have a Shore D hardness in the range of 50–70 and penetrate the corresponding solid layer in normal directions. The golf ball can provide a player with different feels on impact depending on the direction of an external force applied thereto when the golf ball is hit.

15 Claims, 3 Drawing Sheets

GOLF BALLS

BACKGROUND OF THE INVENTION

1. Field of the Invention

The present invention relates to a golf ball having at least a pair of adjacent concentric solid layers, and particularly to a golf ball capable of providing a player with different feels on impact depending on the direction of an external force applied thereto when the golf ball is hit.

2. Description of the Related Art

Some golf balls have at least a pair of adjacent concentric solid layers. Examples of such golf balls include a three-piece golf ball having a two-layered solid core composed of a low-hardness inner core and a high-hardness outer core bonded onto the inner core, and a two-piece golf ball composed of a high-hardness solid core enclosed by a low-hardness cover. In such golf balls, a combination of the low-hardness inner core and the high-hardness outer core or a combination of the high-hardness solid core and the low-hardness cover refers to a pair of adjacent concentric solid layers.

In the conventional golf balls described above, the interface between adjacent concentric solid layers has a smooth spherical shape. Accordingly, an external force applied to a golf ball upon being hit is transmitted from an outer concentric solid layer to an inner concentric solid layer at a substantially constant rate irrespective of the direction of the applied force. That is, the ratio between an external force transmitted from the outer concentric solid layer to the inner concentric solid layer and an external force applied to the outer concentric solid layer is substantially constant. This is because a distance along which an external force is transmitted within the outer concentric solid layer varies little with the direction of an external force applied to the golf ball. Thus, in conventional golf balls, which have a spherical interface between concentric solid layers, provide a player with substantially the same feel on impact irrespective of the direction of an external force applied thereto.

For golf shots intended to impart a large backspin to a golf ball (a chip shot, for example), such as for an approach shot, a player performs a down-blow swing using a golf club having a large loft angle. Consequently, the club face of the golf club hits and rubs the surface of the golf ball downward on impact, resulting in the application of an external force to the golf ball substantially along a tangential direction (a tangent on the ball surface at a position hit by the club face). By contrast, for shots intended to give a golf ball a long travel distance, such as for a driver shot, a player performs an upper-blow swing or level swing using a golf club having a small loft angle. Consequently, the club face of the golf club hits the golf ball on impact such that it substantially faces the center of the golf ball, resulting in the application of an external force to the golf ball substantially along a normal direction (normal to the ball surface at a position hit by the club face).

Some golf balls having at least a pair of adjacent concentric solid layers as described above are designed to provide a soft feel on impact when a player performs a shot, such as an approach shot, intended to impart a large backspin to that golf ball. Examples of such golf balls include the aforementioned three-piece golf balls and two-piece golf balls.

However, when the player attempts a shot intended for a long travel distance, such as a driver shot, the aforementioned golf balls designed to provide a soft feel on impact for an approach shot or the like give a player dissatisfaction as described below. Since this type of conventional golf ball has a spherical interface between adjacent concentric solid layers, as already mentioned, an external force applied to an outer concentric solid layer is transmitted to an inner concentric solid layer at substantially the same ratio when the player makes a driver shot or the like, at which an external force is applied to the golf ball substantially along a normal direction, and an approach shot or the like, at which an external force is applied to the golf ball substantially along a tangential direction. As a result, during a driver shot, a deformation of the inner concentric solid layer, thus a deformation of the entire golf ball, becomes too large, resulting in too soft a feel on impact and thus giving a player an impression as if the golf ball had no core.

SUMMARY OF THE INVENTION

The present invention has been accomplished in view of the foregoing, and an object of the invention is to provide a golf ball having at least a pair of adjacent concentric solid layers and capable of providing a player with different feels on impact depending on the direction of an external force applied thereto when the golf ball is hit.

To achieve the above object, the present invention provides a golf ball comprising at least a pair of adjacent concentric solid layers, an outer concentric solid layer of which comprises a matrix and high-hardness grains, the material of the high-hardness grains having hardness higher than that of the material of the matrix, and the high-hardness grains penetrating the outer concentric solid layer substantially in normal directions.

Preferably, the golf ball comprises three adjacent concentric solid layers, an intermediate concentric solid layer of which comprises a matrix and high-hardness grains, the material of the high-hardness grains having hardness higher than that of the material of the matrix, and the high-hardness grains penetrating the intermediate concentric solid layer substantially in normal directions.

In the present invention, a concentric solid layer refers to a solid layer which is formed of plastic, rubber, or the like as part of a golf ball. Examples of such a concentric solid layer include, but are not limited to, concentric layers constituting a multilayered solid core, concentric layers constituting a multilayered cover, and concentric layers constituting a multilayered solid center for use in a thread-wound golf ball.

Examples of a pair of adjacent concentric solid layers include, but are not limited to, adjacent concentric layers of a multilayered solid core, a solid core and a cover of a two-piece golf ball, a cover and a core layer situated inside the cover of a multi-piece golf ball having a multilayered solid core, an innermost cover layer and a core layer situated inside the cover layer of a golf ball using a multilayer cover, and adjacent concentric layers of a multilayered cover. Examples of three adjacent concentric solid layers include, but are not limited to, an inner core, an outer core, and a cover in a three-piece golf ball, which is composed of a two-layered solid core and a cover, the two-layered solid core composed of an inner core and an outer core bonded onto the inner core.

In the present invention, the term "normal" refers to, when a certain point on the surface of a golf ball is taken as P, a straight line which passes through the point P and is perpendicular to a tangential plane at the point P, and thus corresponds to a line (a radial line) which connects the point P and the center of the golf ball. Accordingly, in the present invention, high-hardness grains that penetrate a concentric solid layer in normal directions denote high-hardness grains that penetrates a solid layer along radial lines.

In a golf ball of the present invention composed of at least a pair of adjacent concentric solid layers or a golf ball of the present invention composed of three adjacent concentric solid layers, an outer solid layer of the former golf ball or an intermediate solid layer of the latter golf ball is composed of a matrix and high-hardness grains having hardness higher than that of the matrix with the high-hardness grains that penetrate the corresponding solid layer in normal directions.

The shape of high-hardness grains is not particularly limited. The high-hardness grains may have a spherical shape, a cylindrical shape having a circular cross section, a cylindrical shape having an elliptical cross section, a cylindrical shape having a rectangular cross section, or the like. In a solid layer composed of a matrix and high-hardness grains, the ratio of the volume of high-hardness grains to the volume of the solid layer (matrix layer+high-hardness grains) is about 20% to about 50%. Further, appropriately, high-hardness grains are homogeneously arranged within the solid layer. When two or more pairs of adjacent concentric solid layers are involved, an outer solid layer of each pair may be composed of a matrix and high-hardness grains.

A golf ball of the present invention can provide a player with different feels on impact depending on the direction of an external force applied thereto when the golf ball is hit. For example, when a player makes an approach shot with the golf ball, during which an external force is applied to the golf ball substantially along a tangential direction, the golf ball provides the player with a soft feel on impact. By contrast, when the player makes a driver shot with the golf ball, during which an external force is applied to the golf ball substantially in a normal direction, the golf ball provides the player with a hard feel on impact.

DESCRIPTION OF THE PREFERRED EMBODIMENT

Figure 1:
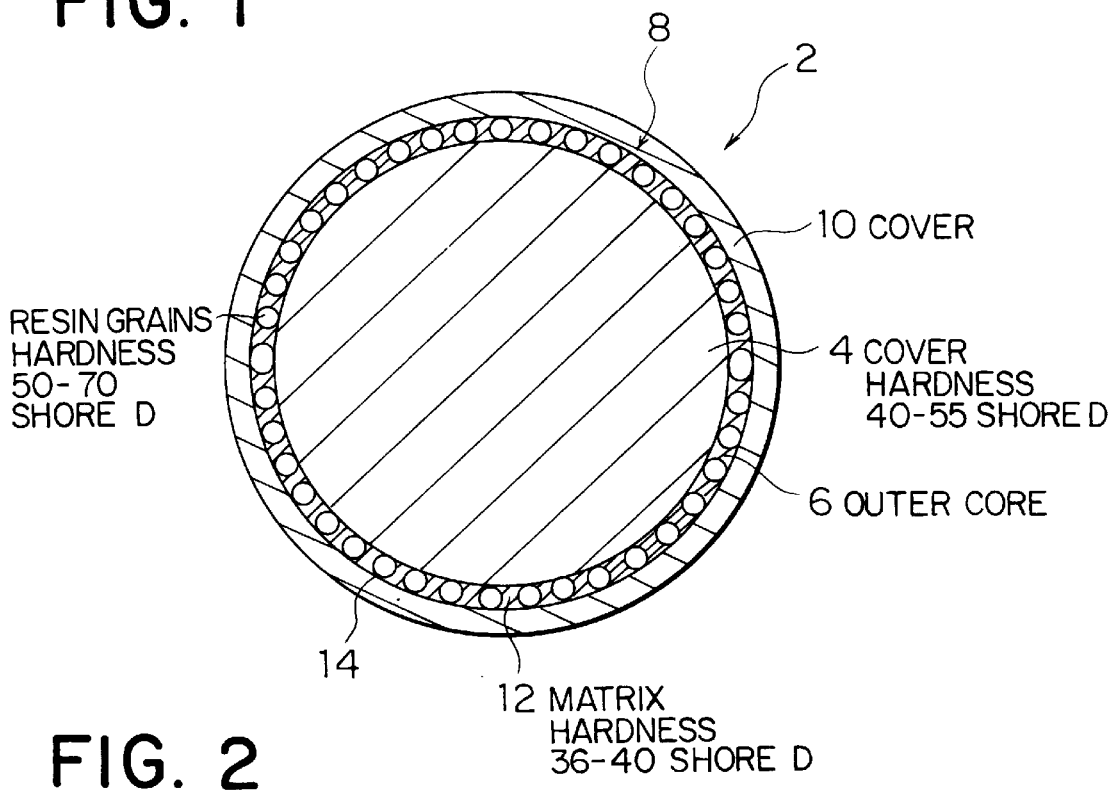
FIG. 1 is a sectional view showing a golf ball according to an embodiment of the present invention.

A preferred embodiment of the present invention will now be described with reference to the drawings. FIG. 1 shows a sectional view of an embodiment of a golf ball according to the present invention. A golf ball 2 shown in FIG. 1 is a three-piece golf ball composed of a two-layered solid core 8 and a cover 10. The two-layered solid core 8 is composed of an inner core 4 (an inner concentric solid layer) and an outer core 6 (an outer concentric solid layer) bonded onto the inner core 4. Since the golf ball 2 of the present embodiment has three adjacent concentric solid layers, namely the inner core 4, the outer core 6, and the cover 10, the outer core 6 is an intermediate concentric solid layer.

Figure 2:
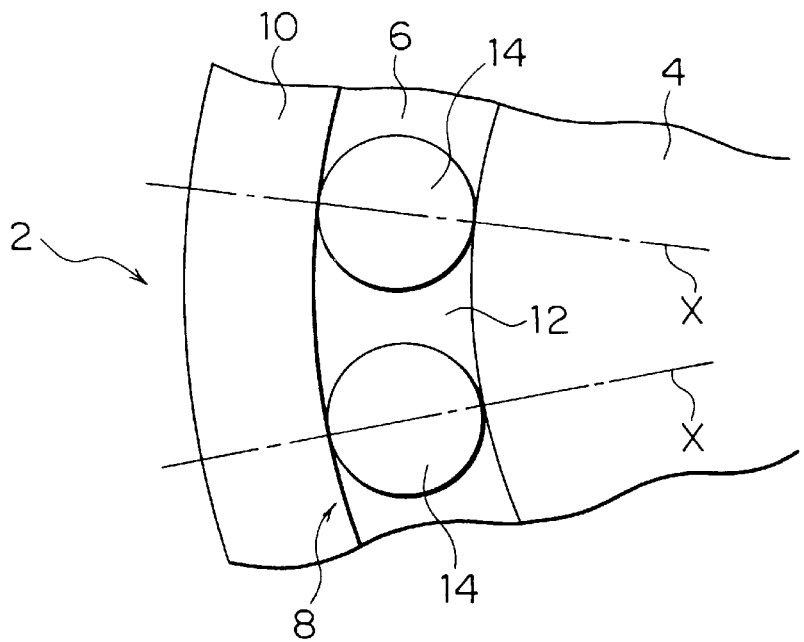
FIG. 2 is a partially enlarged sectional view of the golf ball of FIG. 1.

As shown in a partially enlarged sectional view of FIG. 2, the outer core 6 of the golf ball 2 according to the present embodiment is a solid layer composed of a matrix 12 and a number of high-hardness grains 14 each having a substantially spherical shape. A material for the high-hardness grains 14 has hardness higher than that of a material for the matrix 12. The high-hardness grains 14 are arranged such that they penetrate the outer core 6 in normal directions X. That is, the surfaces of the high-hardness grains 14 are in contact with the inner core 4 and with the cover 10. The high-hardness grains 14 are homogeneously arranged in the outer core 6.

The inner core 4 may be formed of, for example, polybutadiene rubber to a hardness of 40 to 55 on the Shore D scale. The cover 10 may be formed of, for example, an ionomer resin in a single layer or a multilayer. The matrix 12 of the outer core 6 may be formed of a soft resin, such as a two-component-system urethane resin or silicone gel, to a hardness of 36 to 40 on the Shore D scale. The high-hardness grains 14 may be formed of a hard resin, such as an ionomer resin (e.g. Himilan H1605 manufactured by DuPont-Mitsui Polychemical Co., Ltd.), a polyester resin, or a mixture of an ionomer resin and a polyester resin, to a hardness of 50 to 70 on the Shore D scale. However, hardness of the inner core 4, the matrix 12, the high-hardness grains 14, and the cover 10 is not particularly limited but may be selected as appropriate according to purpose.

The action and effect of the golf ball 2 of the present embodiment will next be described. When a player hits the golf ball 2 with an iron club so as to impart a large backspin, and thus a club face moves on impact to slide down the surface of the golf ball 2, an external force is applied to the golf ball 2 substantially in a tangential direction. In this case, since the high-hardness grains 14 of the golf ball 2 are not arranged such that they penetrate the outer core 6 in the direction of the applied external force, a layer of the high-hardness grains 14 deforms significantly when the golf ball 2 is hit, so that the external force applied on impact to the outer core 6 is transmitted to the inner core 4 such that the transmission is little hindered. Accordingly, the inner core 4 deforms to a great extent similar to that of the case where the interface between the inner core 4 and the outer core 6 is spherical, resulting in a soft feel on impact.

By contrast, when a player hits the golf ball 2 with a driver or the like so as to obtain a long travel distance, and thus a club face moves on impact substantially facing the central portion of the golf ball 2, an external force is applied to the golf ball 2 substantially in a normal direction. In this case, since the high-hardness grains 14 are arranged such that they penetrate the outer core 6 substantially in normal directions, the external force applied on impact to the outer core 6 is received by the high-hardness grains 14, thereby hindering the external force from being transmitted from the outer core 6 to the inner core 4. Accordingly, the deformation of the inner core 4 is smaller than that of the case where the interface between the inner core 4 and the outer core 6 is spherical, resulting in a hard feel on impact.

A method for forming a concentric solid layer containing high-hardness grains is not particularly limited. For example, a solid layer which contains high-hardness grains in such a manner as to enclose an inner core is formed preferably by a method composed of the steps of: placing a soft resin in the form of gel or pellets on the inner surfaces of upper and lower molds; placing a hard resin in the form of spherical pellets on the thus-formed layers of the soft resin; holding an inner core between the thus-prepared upper and lower molds; and performing molding through application of heat.

Through use of the molding method as described above, the golf ball 2 of FIG. 2 is manufactured, for example, in the following steps (1) to (6).

Figure 3:
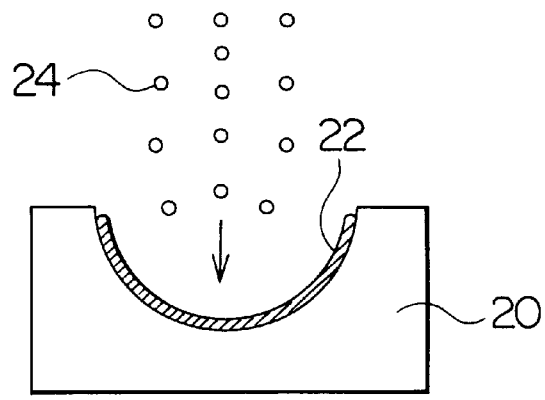
FIG. 3 is a view illustrating a step of manufacturing the golf ball of FIG. 1.

(1) As shown in FIG. 3, a gel 22 of a soft resin, a material for the matrix 12, is applied onto the inner surface of a mold 20, one of upper and lower molds used to form the outer core 6. Pellets of the soft resin may be used in place of the soft-resin gel 22. Spherical pellets 24 of a hard resin are placed on the thus-applied soft-resin gel 22. Thus, as shown in FIG. 4, the hard-resin pellets 24 are arranged in or on the soft-resin gel 22.

Figure 4:
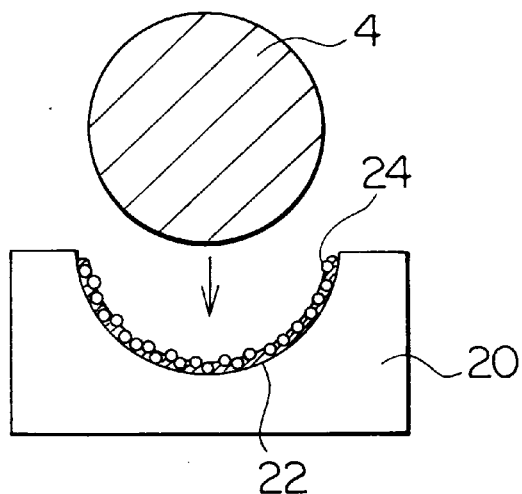
FIG. 4 is a view illustrating a step of manufacturing the golf ball of FIG. 1.
Figure 5:
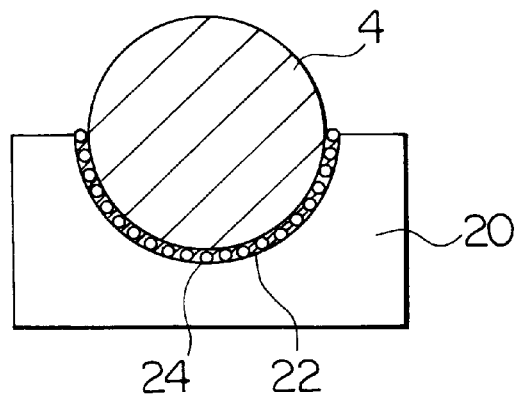
FIG. 5 is a view illustrating a step of manufacturing the golf ball of FIG. 1.

(2) As shown in FIG. 4, the internal core 4 is placed in the mold 20 prepared above in step (1), so that half of the internal core 4 rests in the mold 20, while the other half projects therefrom. Thus, as shown in FIG. 5, in the mold 20, the spherical hard-resin pellets 24 are arranged such that they penetrate the soft-resin gel 22 substantially in normal directions.

Figure 6:
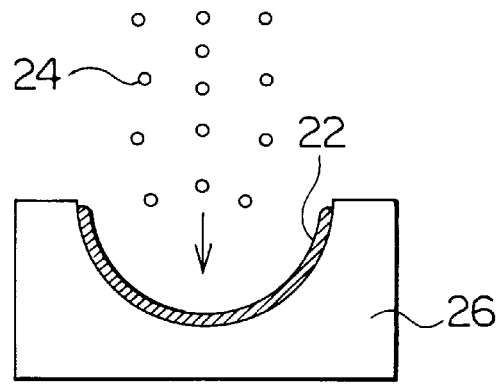
FIG. 6 is a view illustrating a step of manufacturing the golf ball of FIG. 1.

(3) As shown in FIG. 6, the other mold 26 is subjected to preparation work similar to that of the mold 20 in step (1). Thus, as shown in FIG. 7, the hard-resin pellets 24 are arranged in or on the soft-resin gel 22.

Figure 7:
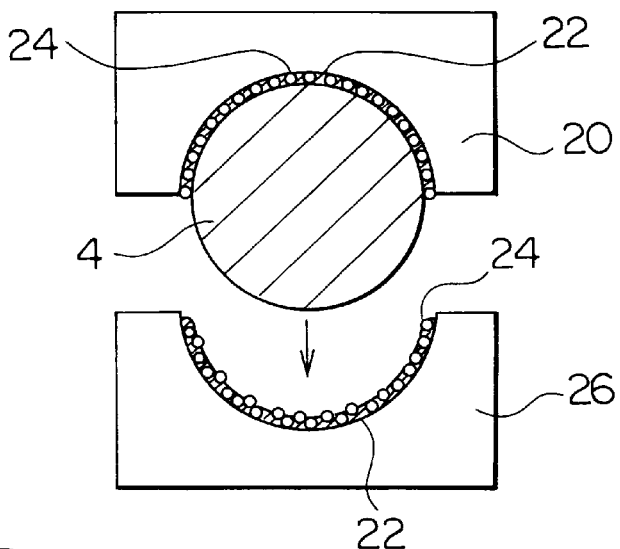
FIG. 7 is a view illustrating a step of manufacturing the golf ball of FIG. 1.

(4) As shown in FIG. 7, the other half of the inner core 4 projecting from the mold 20 is placed in the mold 26 prepared in step (3). Thus, as shown in FIG. 8, in the mold 26, the spherical hard-resin pellets 24 are arranged such that they penetrate the soft-resin gel 22 substantially in normal directions.

Figure 8:
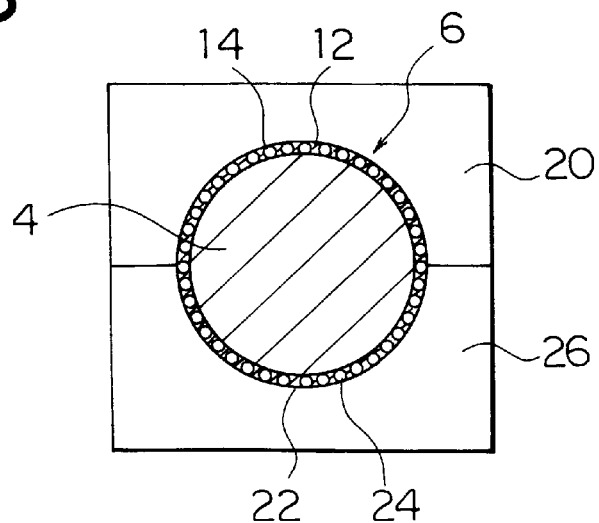
FIG. 8 is a view illustrating a step of manufacturing the golf ball of FIG. 1.

(5) The molds 20 and 26 in the state of FIG. 8 are subjected to molding through application of heat, thereby setting the soft-resin gel 22 and melting the hard-resin pellets 24. Subsequently, the molding is cooled. As a result, the outer core 6 is formed on the inner core 4 (FIG. 8). In this case, the inner core 4 and the outer core 6 are bonded together, while the matrix 12 and the high-hardness grains 14 are bonded together.

(6) Through use of a mold for molding a cover, a cover having dimples is formed on the outer core 6 through injection molding or compression molding.

EXAMPLE

Golf balls shown in FIG. 1 were manufactured according to steps (1)–(6) as described above. The soft-resin gel 22 was a urethane gel (two-component-system urethane dispersion #2515 manufactured by Dainichiseika Color & Chemicals Mfg. Co., Ltd.) prepared by adding a carbodiimide group-containing cross linking agent to an aqueous dispersion system of a carboxyl group-containing linear polymer. The thus-obtained matrix layer 12 showed a hardness of 38 on the Shore D scale. A blend of an Na ionomer and a Zn ionomer was used as a material for the spherical hard-resin pellets 24. The grain size of the hard-resin pellets 24 was 1.8 mm, and the hard-resin pellets 24 showed a hardness of 65 on the Shore D scale. As the inner core 4 was used a polybutadiene rubber core having a diameter of 35.25 mm. The inner core 4 showed a hardness of 65 on the Shore C scale. The molds 20 and 26 had a cavity having a diameter of 38.75 mm. Further, the cover 10 having dimples were formed on the outer core 6 through compression molding. A material for the cover 10 was an ionomer resin.

The thus-obtained golf balls 2 were subjected to a chip shot through use of a pitching wedge and to a full shot through use of a driver. As a result, the golf balls 2 provided a soft feel on impact at the time of a chip shot through use of the pitching wedge, and a hard feel on impact, a feel of the presence of a core, at the time of a full shot through use of the driver.

What is claimed is:

1. A golf ball comprising at least a pair of adjacent concentric solid layers, wherein an outer concentric solid layer of said adjacent concentric solid layers comprises a matrix and non-metallic high-hardness grains homogeneously arranged, said high-hardness grains having hardness higher than that of said matrix, and said high-hardness grains penetrating said outer concentric solid layer substantially in normal directions.

2. A golf ball according to claim 1, wherein the ratio of the volume of high-hardness grains to the volume of the outer concentric solid layer is from 20% to 50%.

3. A golf ball according to claim 2, wherein the ratio of the volume of high-hardness grains to the volume of the intermediate concentric solid layer is from 20% to 50%.

4. A golf ball according to claim 1, wherein the matrix of the outer concentric solid layer has a hardness of from 36 to 40 on the Shore I) scale, and the high-hardness grains of the outer concentric solid layer has a hardness of from 50 to 70 on the Shore D scale.

5. A golf ball according to claim 1, wherein the high-hardness grains have a spherical shape.

6. A golf ball comprising three adjacent concentric solid layers, wherein an intermediate concentric solid layer of said adjacent concentric solid layers comprises a matrix and high-hardness grains, said high-hardness grains having hardness higher than that of said matrix, and said high-hardness grains penetrating said intermediate concentric solid layer substantially in normal directions.

7. A golf ball according to claim 6, wherein the matrix of the intermediate concentric solid layer has a hardness of from 36 to 40 on the Shore D scale, and the high-hardness grains of the intermediate concentric solid layer has a hardness of from 50 to 70 on the Shore D scale.

8. A golf ball according to claim 6, wherein the high-hardness grains are homogeneously arranged within the intermediate concentric solid layer.

9. A golf ball according to claim 6, wherein the high-hardness grains have a spherical shape.

10. A golf ball comprising a core, an intermediate layer and a cover, wherein said core being formed of polybutadiene rubber having a hardness of from 40 to 55 on the Shore D scale, said intermediate layer comprises a matrix and high-hardness grains, said high-hardness grains having hardness higher than that of said matrix and being formed of hard resin having a hardness of from 50 to 70 on the Shore D scale, and said high-hardness grains penetrating said intermediate layer substantially in normal directions.

11. A golf ball according to claim 10, wherein the matrix of the intermediate layer has a hardness of from 36 to 40 on the Shore D scale.

12. A golf ball according to claim 10, wherein the matrix of the intermediate layer is formed of urethane resin or silicon gel.

13. A golf ball according to claim 10, wherein each of the high-hardness grains is formed of an ionomer resin, a polyester resin or a mixture of an ionomer resin and a polyester resin.

14. A golf ball according to claim 10, wherein each of said high-hardness grains has a substantially spherical shape.

15. A golf ball according to claim 10, wherein the high-hardness grains are homogeneously arranged within the intermediate concentric solid layer.

* * * * *